United States Patent Office 3,712,976
Patented Jan. 23, 1973

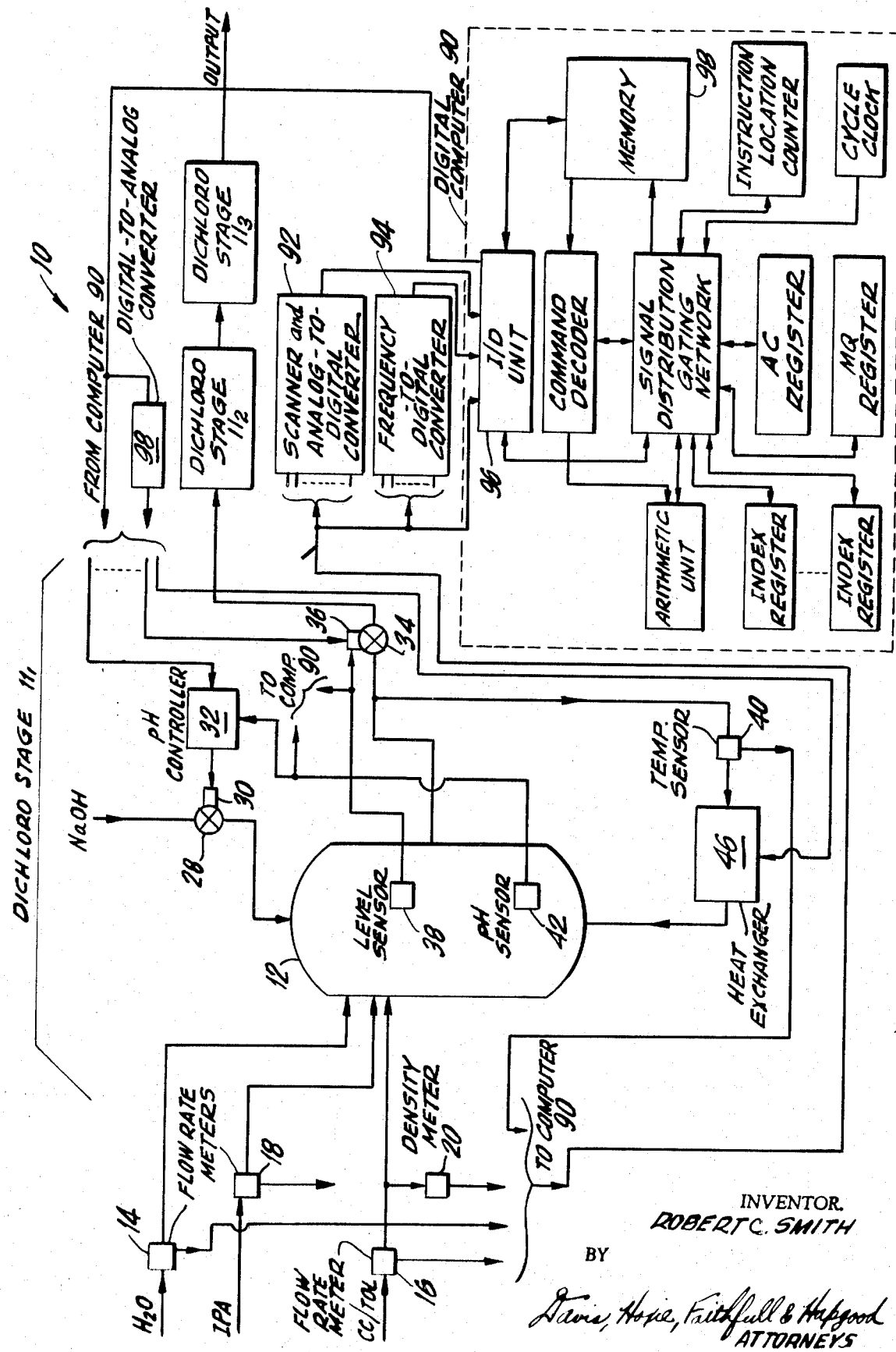

3,712,976
COMPUTER CONTROLLED DICHLORO
REACTION SYSTEM
Robert C. Smith, Baton Rouge, La., assignor to Geigy
Chemical Corporation, Greenburgh, N.Y.
Filed July 28, 1970, Ser. No. 58,974
Int. Cl. G06f 15/46
U.S. Cl. 235—151.12
18 Claims

ABSTRACT OF THE DISCLOSURE

Cyanuric chloride and an alkylamine are reacted in a plural stage reactor system under stored program computer control to form a 2,4-dichloro-6-alkylamine-5-triazine ("dichloro"). The computer operates on the physical reactor system parameters, reported by an array of transducers, in accordance with a stored mathematical model of the reactor system to determine the purity of the output dichloro product, and the effective reactant losses through a hydrolysis mechanism. A series of projected perturbations for the reactor parameters are then employed to seek a direction of change for the array of controlled parameters about their existing values to improve the operational status of the dichloro reaction. In particular, the computer acts via interfacing apparatus and plant controllers to operate and maintain the dichloro reactor system in a preferred status which minimizes hydrolysis losses while maintaining output dichloro at or above a lower purity limit.

---

This invention relates to a chemical process and, more specifically, to an improved method and apparatus employing stored program computer control for efficiently producing a 2,4-dichloro-6-alkylamine-5-triazine (hereinafter "dichloro").

Dichloro is an intermediate product in the preparation of certain herbicides, and may be formulated by reacting cyanuric chloride with a lower alkylamine, say a $C_1$–$C_5$ alkylamine and typically isopropylamine, in the presence of aqueous sodium hydroxide (caustic) in accordance with the following reaction:

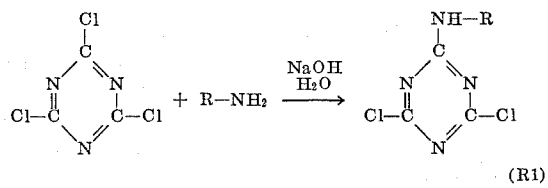

(cyanuric chloride)   (alkylamine)   (dichloro)

where R is alkyl of one to five carbon atoms, typically isopropyl.

However, as an incident to this reaction, losses are encountered. In particular, a portion of the cyanuric chloride irreversibly hydrolyses as by

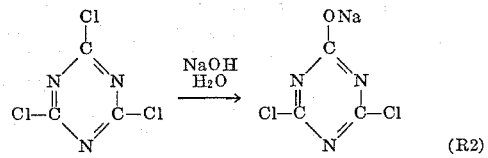

and part of the formed dichloro is similarly lost through hydrolysis, the mechanism being

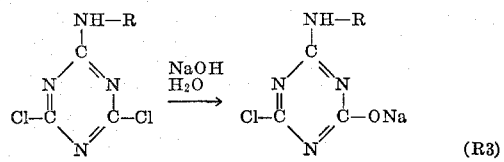

Also, the output of the composite dichloro reaction process includes certain impurities, viz, unreacted cyanuric chloride and alkylamine, and diamino compounds such as propazine formed by

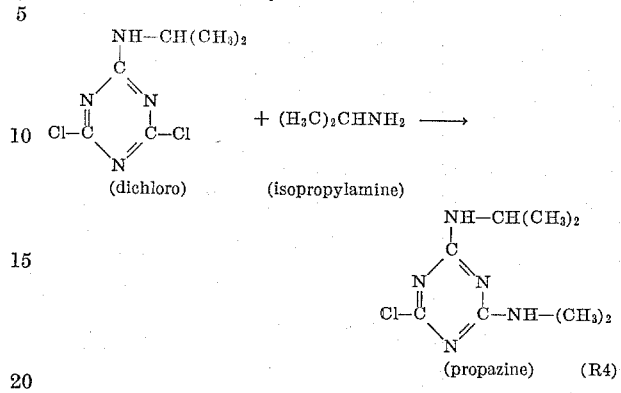

(dichloro)   (isopropylamine)

(propazine)   (R4)

The purity of the herbicide made from dichloro is directly related to dichloro purity.

It is an object of the present invention to provide an improved method and apparatus for preparing dichloro.

More specifically, an object of the present invention is to provide a computer controlled method and apparatus, operating under stored program control, for preparing dichloro in a manner which minimizes hydrolysis losses while maintaining the dichloro output product at or above a lower purity limit.

The above and other objects of the present invention are realized in a specific illustrative process and apparatus wherein cyanuric chloride, isopropylamine and caustic are supplied as inputs to the first stage of a plural stage reaction system. Each reactor stage includes a plurality of transducers for supplying information characterizing the reaction in that stage to a computer, e.g., temperature, reactant level, flow rate, reaction pH, and the like. Also associated with each reactor stage are a plurality of controllers which are selectively adjustable by commands issued by the computer, e.g., valves for caustic flow (pH control), reagent level regulation by interstage flow control, and heat exchanger regulation to effect temperature control.

The computer determines the instantaneous dichloro output purity and hydrolysis losses for any existing status of the dichloro reaction system by employing an iteratively operable stored program mathematical model thereof. The computer then makes test perturbations in the magnitude of the controlled system parameters to determine an improved set of operating conditions which reflect changes in some or all of these operating parameters. "Improvement" in this regard means reducing hydrolysis losses without reducing purity below a minimum acceptable lower limit. If an acceptable improvement is found for a modified set of operating parameters, the computer puts this derived new reactor plant status into effect by signaling the plant controllers to effect corresponding modifications.

This process is cyclically continued, either without end for dedicated computer installations where the computer is employed only to service dichloro processing, or until no significant improvement is found possible after repeated attempts if the dichloro system time shares the computer with other tasks.

The above and other objects of the present invention are realized in a specific embodiment thereof, described hereinbelow in conjunction with the accompanying drawing, which schematically depicts an illustrative dichloro preparation arrangement which embodies the principles of the present invention.

Referring now to the drawing, there is shown a composite dichloro reaction system 10 employing plural reaction stages $11_1$, $11_2$, $11_3$. Only one stage, $11_1$, has been shown in detail, it being understood that $11_2$ and $11_3$ are similar to $11_1$. It will further be understood that a greater or lesser number of stages may be used in any specific plant. In the drawing, reagent flow paths are shown by relatively wide lines, and electronic signal paths are indicated by relatively narrow lines. Examining in detail the reactor stage $11_1$, illustrative of the stages $11_2$ and $11_3$ as well, there is included a reaction vessel 12 for containing the several reactants required to prepare the desired dichloro product.

Cyanuric chloride, advantageously dissolved in a suitable medium such as toluene, and an alkylamine, e.g., isopropylamine, are directly supplied to the vessel 12, the rate of flow of these constituents into the first stage $11_1$ being measured by associated flow rate meters 16 and 18 and communicated therefrom to a digital computer 90. Further, the density of the cyanuric chloride-toluene mixture, which is a direct measure of the proportionate amount of cyanuric chloride therein, is determined by an element 20 and coupled as an electrical signal to the computer.

Water and caustic are supplied to the vessel 12, the caustic selectively flowing through a valve 28. The valve 28 is regulated by a reaction pH controller 32 which is directly operated by an input/output unit 96 of the computer 90. The output of a pH sensor 42 disposed within the reaction chamber is also connected to the controller 32. The pH controller 32, will known per se, selectively allows sodium hydroxide to flow through the valve 28 into the chamber 12 to maintain the reaction pH at the value specified by the computer.

The dichloro reaction (R1) is exothermic, and the contents of the chamber 12 are cycled through a heat exchanger 46 for cooling. The heat exchanger 46 includes a controller for regulating the temperature of the reagents in the chamber 12 by varying the effective cooling rate. For example, a valve and controller may be employed to control the rate of coolant flow, or to control the reagent throughput flow rate. To communicate the instantaneous reaction temperature to the computer 90, a temperature sensing transducer 40, e.g., a resistance thermometer or thermocouple, is exposed to the reactants of the reactor 12.

By way of further reaction control for the processing stage $11_1$, a level sensor 38 is included in the reaction chamber 12. An interstage valve 34 between the dichloro reaction stages $11_1$ and $11_2$ is operated by a valve controller 36 under computer command to selectively permit passage of effluent between stages, thereby controlling the volume of material in the tank 12.

For overall goals as above stated, it is desired that the output of the last dichloro stage, i.e., the stage $11_3$ for the assumed configuration, have a minimum dichloro "purity." "Purity" for the instant process, expressed in percentage form, is defined as $$\frac{DC \times 100}{DC + CC + PR + IPA}$$

where DC, CC, IPA and PR respectively comprise the dichloro, unreacted cyanuric chloride, unreacted isopropylamine, and propazine in the third (last) stage effluent. Further as above stated, it is desired that the dichloro system operate with minimum material loss via the hydrolysis mechanism while maintaining product purity at or above the lower bound.

By way of a brief overview of dichloro processing in accordance with the present invention, the instantaneous state of selected reactor system parameters is registered in digital form in corresponding storage cells in a computer memory 98. Thus, for example, analog signals forming the output of the temperature, pH, and level sensors 40, 42 and 38 are sequentially scanned, converted to digital form and registered in the computer 90 by a scanner and analog-to-digital converter 92 under computer control. Pulse repetition rate signals representative of flow rates, generated by flow rate meters of typical construction, such as positive displacement meters, 14, 16 and 18 are converted to digital form by any known converter 94 therefor. The converter 94 may simply comprise a series of counter-registers which are periodically cleared, with the contents of the registers being periodically gated through to latch circuits or to the computer 90 directly. The equipment items 92-94 are well known per se, and are available, for example, from International Business Machines Corporation or Digital Equipment Corporation. Alternatively, the input data may be converted to digital form and registered in memory under stored program control operable in conjunction with peripheral computer hardware. One such program, identified by the call name PROSPRØ, is available from International Business Machines Corporation.

With the dichloro reaction in progress and its several characteristic operative physical parameters (temperatures, levels, flow rates and the like) registered in computer memory, a mathematical model of the dichloro system is called upon to operate on the stored parameters and compute desired, derived quantities, viz, dichloro outputs, unreacted cyanuric chloride and isopropylamine outputs, propazine output and, finally, purity and hydrolysis loss. This computation is done on an iterative basis for each stage, and proceeds from reactor stage to the next following stage toward the output of dichloro stage $11_3$.

Relatively small test changes are then projected for the magnitude of those plant variables which are subject to control by the computer 90. The varied set of operating conditions are inserted seriatim in the stored program model of the dichloro reactor to develop approximations to a corresponding series of partial differentials of purity and hydrolysis with respect to the several controlled parameters.

As a next operation, the differentials are examined in aid of selecting a possible new set of operating conditions which gives rise to improved reactor operation, i.e., lowered hydrolysis loss without reducing output dichloro purity below the minimum bound. The new conditions are tested by the reactor system model to confirm that the desired goals have been achieved. Upon verification, the computer instructs the plant controllers 32, 36, 46 (and others if additional parameters are regulated by controllers) to physically implement the new plant parameters thereby realizing the computed reduction in hydrolysis losses.

With the above general overview in mind, specific illustrative coding sequences which perform the above operations will now be considered. The FØRTRAN compiler language is employed herein for purposes of illustration, but it is to be understood that other compiler, assembly, or direct machine languages may be employed to cause like or equivalent computing machine operation.

As a starting point, assume that the composite dichloro processing apparatus shown in the drawing is operative at a first set of conditions, either prescribed by initial values stored in the computer 90 or as physically adjusted by manual overriding operation of the several plant controllers. Let a storage vector TEMP (I) store the temperatures of the reactor stages $11_1$–$11_3$ sensed by the transducers 40 in memory 98 in locations TEMP (1), TEMP (2), and TEMP (3); the vector PH (I) contain the three reactor-stage pH values in PH (1), PH (2), and PH (3); the reactant levels (volumes) in the three chambers 12 be stored in VLEVL (1), VLEVL (2), VLEVL (3); the water, isopropylamine and cyanuric chloride-toluene input flow rates reside in RH2Ø, RIP and RCCT, respectively; and the weight percent of cyanuric chloride in toluene from the specific gravity measurement (the output of meter 20 in digital form, in PCTCC.

Accordingly, the input flow of cyanuric chloride to the first reaction stage $11_1$ CCI (1), and toluene flow TOL which is substantially the same for all reactor stages are derived by $$95CCI(1) = RCCT*PCTCC/100 \quad (1)$$
$$TOL = RCCT - CCI(1) \quad (2)$$

on a linear proportionate basis. In FORTRAN symbology, a single asterisk signifies multiplication, i.e., $AD*EF$ corresponds to $AD \cdot EF$; a slash represents division; EXP(X) represents $e^x$ where $e$ is the number whose natural logarithm is one; and a double asterisk as $A**B$ identifies A raised to the B power (exponentiation).

Purity and hydrolysis losses for the composite reactor are computed by calling upon a mathematical model stored program routine (MODEL) of the dichloro reaction apparatus. The model operates in an iterative manner to compute the effluent flows of interest for each reactor stage. In particular, an appropriate set of equations for each stage of the instant dichloro reaction are $$CC_{oi} = CC_{ii}$$

(rate of cyanuric chloride leaving stage $i$)     (rate of cyanuric chloride entering stage $i$)

$$-k_1 \cdot T_1(t_i) \cdot A_{oi} \cdot CC_{oi} \cdot PH_1(pH_i) x \frac{L(l_i)}{F(rtol_i, rwat_i)}$$

(rate of conversion of cyanuric chloride to dichloro in stage $i$)

$$-k_2 \cdot T_2(t_i)(k_3 + k_4 PH_2(pH_i)) \cdot CC_{oi}$$

(rate of hydrolysis of cyanuric chloride in stage $i$)     Equation (1)

$$A_{oi} = A_{ii}$$

(rate of isopropylamine leaving stage $i$)     (rate of isopropylamine into stage $i$)

$$-k_1 \cdot T_1(t_i) \cdot A_{oi} \cdot CC_{oi} \cdot PH_1(pH_1) \cdot \frac{L(l_i)}{F(rtol_i, rwat_i)}$$

(rate of conversion of cyanuric chloride to dichloro)

$$-k_5 \cdot T_3(t_i) \cdot A_{oi} \cdot DC_{oi} \cdot PH_1(pH_1) \cdot \frac{L(l_i)}{F(rtol_i, rwat_i)}$$

(rate of propazine formation in stage $i$)     Equation (2)

$$H_{oi} = H_{ii}$$

(rate of formation of hydrolysis products which leave the state $i$)     (rate of flow of hydrolysis products into stage $i$)

$$+k_6 T_2(t_i)(k_7 + k_8 PH_2(pH_i)) \cdot DC_{oi} + k_2 \cdot T_2(t_i) \cdot (k_3 + k_4 \cdot PH_2(pH_i)) \cdot CC_{oi}$$

(rate of hydrolysis of dichloro in stage $i$)     (rate of hydrolysis of cyanuric chloride)

Equation (3)

$$DC_{oi} = DC_{ii}$$

(rate of dichloro leaving stage $i$)     (rate of dichloro entering stage $i$)

$$+k_1 \cdot T_1(t_i) \cdot A_{oi} \cdot CC_{oi} \cdot PH_1(pH_i) \times \frac{L(l_i)}{F(rtol_i, rwat_i)}$$

(rate of conversion of cyanuric chloride to dichloro)

$$-k_6 \cdot T_2(t_i)(k_7 + k_8 PH_2(pH_i)) \cdot DC_{oi}$$

(rate of hydrolysis of dichloro)

$$-k_5 \cdot T_3(t_i) \cdot A_{oi} \cdot DC_{oi} \cdot PH_1(pH_1) \cdot \frac{L(l_i)}{F(rtol_i, rwat_i)}$$

(rate of propazine formation)     Equation (4)

$$PRZ_{oi} = PRZ_{ii}$$

(rate of propazine leaving stage $i$)     (rate of propazine entering stage $i$)

$$+k_5 T_3(t_i) \cdot A_{oi} \cdot DC_{oi} \cdot PH_1(pH_1) \cdot \frac{L(l_i)}{F(rtol_i, rwat_i)}$$

(rate of propazine formation)     Equation (5)

where $t_i$, $pH_i$, $rtol_i$, $rwat_i$ and $l_i$ are the temperature pH, rate of toluene flow, rate of water flow, and height of reactants for the $i$th reactor stage $11_i$, and wherein the corresponding capital letters identify functions of the variables. The temperature functions T(t) are of the form $e^{c_1 t}$ ($c_1$ being a constant); the pH functions comprise $$PH_1 = \frac{1.}{\frac{rwat \cdot (1. + C_3/10^{pH-14})}{3 \cdot rtol} + 1.}, \quad PH_2 \sqrt{10^{pH-14}}$$

and the flow function F being of the form $(rtol+rwat)$ $(rtol)$.

For simplicity, Equations 1–5 above can be rewritten $$CC_{oi} = CC_{ii} - RCCDC_i - RHCC_i \quad \text{Equation 6}$$
$$A_i = A_{ii} - RCCDC_i - RPZ_i \quad \text{Equation 7}$$
$$H_{oi} = H_{ii} + RHCC_i + RHDC_i \quad \text{Equation 8}$$
$$DC_{oi} = DC_{ii} + RCCDC_i - RHDC_i - RPZ_i \quad \text{Equation 9}$$
$$PRZ_{oi} = PRZ_{ii} + RPZ_i \quad \text{Equation 10}$$

where the several factors represent identical physical flows in Equations 1–5 and 6–10.

The Equations 1–5 or 6–10 are completely determinative of dichloro reactor functioning for required purposes here. Equations 3 and 8 when applied to the final dichloro stage $11_3$ for the assumed three stage reactor yield the hydrolysis losses directly, and $CC_{03}$, $RPZ_{03}$, $RCCDC_{03}$ and $A_{03}$ are all the factors required to determine purity. When embodied by a stored program, these relationships thus form a complete model of the dichloro reaction.

It will be appreciated that it is inconvenient to directly solve the above equation for the desired derived quantities directly. In particular, the unknown variables $CC_{oi}$, $A_{oi}$, and $DC_{oi}$ are functions of themselves, and of each other. Accordingly, I solve these equations by an iterative process, assuming some initial value for the output flows, e.g., $A_{oi} = .01*A_{ii}$, and then repeatedly applying the relationships with the values from the previous computations until the applied and computed values for the output flows agree within an arbitrarily small acceptable error.

The subroutine, or MACRØ series of FØRTRAN statements, identified by the call name MØDEL, for determining purity and hydrolysis losses from a set of actual or contemplated operating conditions can thus comprise

```
100  RIPAI(1)=RIP                                      (3)
     RHI(1)=0.0                                        (4)
     RPRZI(1)=0.0                                      (5)
     DRCl(1)=0.0                                       (6)
     DØ110N=1,3                                        (7)
110  RIPAØ(N)=0.1*RIPAI(N)                             (8)
     DØ170I=1,3                                        (9)
150  RCCDC(I)=Cl*(EXP(CCl*TEMP(I)*/
     RIPAØ(I)*CCØ(I)*1.0/(RH2Ø*/
     (1.0+CC3/10.0**PH(I)–14.0)))//
     3.0*TOL*VLEV(1)/(TØL+RH2Ø)(TØL)                  (10)
     RHCC(I)=C2*(EXP(Cl*TEMP(I)))*/
     (C3+C4*1.0/(RH2Ø*(1.0+CC3/10.0**/
     (CC3/PH(I))–14.0)))/3.0*TØL*CCØI(I)              (11)
     PRZ(I)= ....                                     (12)
     RHCC(I)= ....                                    (13)
     RHDC(I)= ....                                    (14)
     CCØ(I)=CCl(I)–RCCDC(I)–RHCC(I)                   (15)
     RIPP=RIPAØ(I)                                    (16)
     RIPAØ(I)=RIPAI(I)–RCCDC(I)–PRZ(I)
                                                      (17)
```

$$RH\emptyset(I) = RHI(I) + RHCC(I) + RHDC(I) \quad (18)$$
$$RDC\emptyset(I) = RDCI(I) + RCCDC(I) - RHDC(I) - PRZ(I) \quad (19)$$
$$RPRZ\emptyset(I) = RPRZ(I) + PRZ(I) \quad (20)$$
$$IF(RIPA\emptyset(I) - RIPP) - ERR\emptyset R) \; 152, 152, 150 \quad (21)$$
$$152 \quad CCI(I+1) = CC\emptyset(I) \quad (22)$$
$$RIPAI(I+1) = RIP\emptyset(I) \quad (23)$$
$$RHI(I+v) = RH\emptyset(I) \quad (24)$$
$$RPRZ(I+1) = RPRZ\emptyset(I) \quad (25)$$
$$RDCI(I+1) = RDC\emptyset(I) \quad (26)$$
$$170 \quad C\emptyset NTINUE \quad (27)$$

where

I is a dummy running variable for the DØ loops (statements (7)–(8), (9)–(27);

CCØ(I) is a vector for the cyanuric chloride flow out of state I;

RIPAI(I) and RIPAØ(I) correspond to the isopropylamine flows into and out of the stage I, respectively;

RCCDC(I) is the rate of conversion of cyanuric chloride to dichloro in the stage I;

RHI(I) and RHØ(I) are the hydrolysis flow rates into and out of the stage I;

RHCC(I) and RHDC(I) correspond to the rates of hydrolysis of cyanuric chloride and dichloro within the stage I, respectively;

PRZ(I) identifies the rate of propazine formation in the stage (I);

RPRZØ(I) and RPRZI(I) are the propazine flows out of, and into the state I, respectively;

RIPP is a storage location for preserving RIPAØ(I) from the last previous computation;

RDCØ(I) and RDCI(I) correspond to dichloro flow into and out of a state I; and entries of the form Cl or CCl are constants.

Examining the computation effected by the above FØRTRAN statement sequence, the variables for the input flows to the first dichloro producing stage $11_1$ are initialized by statements (1) through (8). In particular, the actual reactant inputs to the first stage (isopropylamine and cyanuric chloride) are set to the actual flow values CCI(1) and RIP, while the effluents prepared as outputs by the instant reaction (and thus not supplied as inputs to the first reactor stage $11_1$), viz., hydrolysis products, dichloro, and propazine, are set to zero.

Statements (7)–(8) bound a so-called "DØ loop." As a general matter, a statement sequence of the form $$D\emptyset 200M = N, \; NN, \; J$$
---
---
200 --- gives rise to repeated executions of the statements between the DØ statement and that identified by the label ("200"), with a running index variable M starting with a value N (positive) and increasing toward the NN value on each successive pass through the statement array with an increment J,J automatically being one if omitted. For the present program, the DØ statement (7) thus causes statement (8) as assembled to be executed three times, for each of the three reactor stages, thus initializing the output isopropylamine flow of each stage to zero.

The DØ loop between statements (9) and (27) comprises the principal operative portion of the stored program model of the dichloro reaction in accordance with the Equations 1–5 or 6–10. As noted above, these equations are solved in an iterative manner. It is first assumed that $RIPA\emptyset(1) = 0$ (statement (8)), and all of the required individual factors of Equations 1–5 are computed (statements (11)–(14)). Next, the output flows from the stage $11_1$ (I=1 on the first DØ loop pass), viz., CCØ(1), RIPAØ(1), RHØ(1), RDCØ(1) and RPRZØ(1) are determined (statements (15)–(20)). It is observed that the computed rate of flow of isopropylamine RIPAØ(1) will be greater than the initial assumed value of zero (this will be true of every repeated computation as RIPAØ(1) monotonically approaches its actual value after each iteration).

Statement (21) is a program branching test, and is of the general form $$IF(A-B) \; 100, \; 200, \; 300$$

which signifies that the computer program counter to transfer for the next operation to a statement identified by the label 100, 200, or 300 if the expression (A−B) is negative, zero or positive, respectively. For the present program, the testing statement causes repeated recomputations of the statements (10)–(20) as the computed value RIPAØ(1) monotonically approaches the assumed value therefor during the run stored in RIPP, i.e., /RIPAØ(1)—RIPP/ becomes smaller after each successive pass. When the two values are at or within an acceptable difference, (the difference being a fixed number stored in a storage location ERRØR), i.e., when $$RIPA\emptyset(1) - RIPP \leq ERR\emptyset R$$

such that the argument of statement (21) is zero or negative, the iteration is completed, and program control passes to the statement labeled 152 (statement (22)). For clarity and simplicity, only the iteration for RIPAØ(I) has been included in the coding. Like IF tests and value preserving statements corresponding to statement (16) may be employed to explicitly effect iterations for the other requisite output flow variables.

At this point, the effluent flows for the first reactor stage $11_1$ have been determined. Accordingly, the input flows to the second stage are set equal to the output flows of the first stage in statements (22)–(26). The CØNTINUE statement is then reached whereupon the running variable I is incremented to a value 2, and program control is returned to statement (10) to begin the iterative computation for the second stage.

The above processing continues until the output flows for the third and final stage have been determined. The desired values for purity PUR and hydrolysis losses HYDLS for the composite reaction are then found as by $$PUR = RDC\emptyset(3) * 100.00 / (RDC\emptyset(3) + CC\emptyset(3) / + RIPA\emptyset(3) + RPR2\emptyset(3)) \quad (28)$$

$$HYDLS = RH\emptyset(3) \quad (29)$$

By plant design, it is assumed that the purity PUR equals or exceeds a minimum lower bound PURLS for the start-up condition, or may be set to this condition by the manual adjustment of the reaction parameter controllers. Alternatively, as discussed below, the program may include statements to accommodate the start-up condition.

The next functioned step in a continuing effort to improve dichloro system operating efficiency is to determine the effect on purity and hydrolysis losses for perturbations in the several controllable variables, considered singly, i.e., to compute approximations to $\dfrac{\partial (purity)}{\partial t_1}$ partial derivative of purity with respect to the first stage temperature $t_1$— DPDT(1)

$\dfrac{\partial (hydrolysis)}{\partial t_1}$ partial derivative of hydrolysis with respect to the first stage temperature $t_1$— DHDT(1).

Similarly, the partial derivatives of purity and hydrolysis with respect to the other controllable plant variables for each stage are determined thereby developing a set of vectors DPDT(I), DHDT(1); DPDPH(I), DHDPH(I)— partials with respect to pH; and DPDL(I), DHDL(I)— partials with respect to reagent level (volume). Additional functional relationships may be determined by employing additional process parameter controllers.

The partial derivatives may be determined by mathematically incrementing the reported values for the plant variables one at a time, and determining the effect on purity and hydrolysis caused by the increment. For example, DPDT(1) and DHDT(1) may be derived by $$TEMP(1) = TEMP(1) + TINCl \quad (30)$$

CALL MODEL (31)

$$PURM = RDC\emptyset(3)*100.00/RDC\emptyset(3) + CC\emptyset(3) + RIPA\emptyset(3) + RPR2\emptyset(3) \quad (32)$$

$$HYDLSM = RH\emptyset(3) \quad (33)$$

$$DPDT(1) = (PURM-PUR)/TINCl \quad (34)$$

$$DHDT(1) = (HYDM-HYDLS)/TINCl \quad (35)$$

$$TEMP(1) = TEMP(1) - TINCl \quad (36)$$

Statement (30) increments the actual temperature value of the first stage stored in TEMP(1) by an amount TINCl. TINCl may be a fixed number or a function, e.g., 0.01*TEMP(1). The MODEL routine (statements (3)–(27)) is then called to recompute the plant parameters anew, using the same inputs as before except for TEMP(1) which has been changed. Modified purity (PURM) and hydrolysis (HYDLSM) variables are then computed (statements (32) and (33)), and the partial derivatives determined (statements (34) and (35)). Finally, the first step temperature TEMP(1) is restored to its actual value.

The remaining partial derivatives are computed in a manner corresponding to that given by statements (30)–(36), merely changing the variable and its corresponding increment.

The array of partial derivatives is next examined to determine what, if any, change or changes should be made in any controlled variable to improve dichloro system operation. Within the broad guidelines that purity may be reduced to a lower bound PURLB to obtain a reduction in hydrolysis losses, there is wide latitude in making a decision as to when a change in the plant operating conditions is worthwhile. One illustrative, conceptually simple linear program approach is IF (ABSVF(DHDT(1)−DPTLB)) 190,180,180 (37)
180 IF (DHDT(1)) 182,182,183 (38)
182 TEMP(1)=TEMP(1)+TINCC (39)
G∅ T∅ 190 (40)
183 TEMP(1)=TEMP(1)−TINCC (41)
190 - - - (42)

Statement (37) tests DHDT(1) to see if any change in the first stage will be worthwhile, i.e., if the absolute value of DHDT(1) equals or exceeds a minimal gradient bound DPTLB. If so, statement (38) is next executed to test the partial derivative for polarity, and transfers to a statement labeled 182 or 183 to vary TEMP(1) with a positive or negative increment TINCC (which may or may not be the same as TINC) if DHDT(1) is negative or positive, respectively. Program control then passes to the statement (42) labeled 190 et. seq. to selectively change the other variables in a like manner. If DHPT(1) does not exceed DPTLB, the program transfers directly from statement (37) to statement (42) without changing TEMP(1).

Other additional or substitute norms, or conditions for changing a parameter may be employed. For example, for start-up or to maintain dichloro purity, parameters may be varied to increase purity by testing the purity partial derivatives for magnitude and polarity in a manner comparable to statements (37)–(42).

After all plant variables have been mathematically changed, purity and hydrolysis loss are again recomputed by CALL MODEL (43)
PURM= - - -(See statement (28) or (32)) (44)
HYDLSM= (See statement (29) or (33)) (45)

The computer is now in a position to physically implement the heretofore only conceptually changed plant variables by signaling the several plant controllers. This is done as by IF (PURM−PURLB) 210,200,200 (46)
200 IF (HYDLSM−HYDLS) 201,210,210 (47)
201 D∅ 205 N=1,3 (48)
TC(N)=TEMP(N) (49)
PHC(N)=PH(N) (50)
205 VLC(N)=VLEV(N) (51)
G∅ T∅ 250 (52)
210 - - - (53)
- - -
250 - - - (54)
- - -
G∅ T∅ 95 (55)

Statements (46) and (47) are tests to confirm that the lower purity bound is not exceeded, and that there was an actual lowering of hydrolysis products, i.e., that there was no synergistic interaction among the variables such that the overall hydrolysis change was of an opposite polarity than that projected from the separately computed and considered individual partial derivatives. If either of these tests are not satisfied program control transfers to statement (53).

Assuming both tests (46) and (47) are satisfied, the D∅ loop (48)–(51) sets an array of storage locations TC(N)-temperature controller setting for the several reactor stages; PHC(N)-pH controllers; and VLC(N)-volume (level) controllers equal to the computed improved parameter values. The plant controllers, i.e., the heat exchangers 46, the pH controllers 32, and the level controllers 36–34–36 respond to digital quantities stored in the storage locations TC(N), PHC(N) and VLC(N) via the computer input/output unit 96 (and by way of a digital-to-analog converter 98 for analog signal responsive controllers) to physically implement the preferred plant conditions derived in the computer 90.

Statement (52) then transfers program control to a statement labeled 250 for any sort of program execution or other processing control not necessarily connected in any way with dichloro processing.

At some point, (see statement (55)) program control will again pass to the instruction (1) to begin the above-described dichloro processing anew, seeking to further improve dichloro processing efficiency. If the computer 90 has no other responsibility besides dichloro processing supervision, i.e., if the computer 90 is dedicated to the control of dichloro processing, the statement labeled 250 may directly comprise to G∅ T∅ statement to begin a new cycle operation seeking to further improve plant efficiency.

If the tests of statements (46) and (47) are not satisfied, the controller resetting instructions corresponding to statements (48)–(52) are not executed, and program control passes to statement (53). Statements (53) et. seq. may seek to effect a dichloroplant improvement using available information, as by using permutations of the partial derivative factors to find a significant (or the largest improvement based upon a subset of the total available factors. A. J. Goldstein Pat. 3,383,661 discloses permutation generating apparatus, having a program counterpart. Other programs to a similar effect are well known to those skilled in this art. Alternatively, statements (53) et. seq. may assume that no improvement may be made to the current plant status, and simply transfer to statement (1) one or more times to begin a new computation cycle in the expectation that some variable may have changed in the interim.

The above program coding has embodied one norm and algorithm for determining and implementing changes in dichloro system parameters based upon derived differentials. One other such linear programming sequence is attached hereto as an appendix.

The internal components of the computer 90 which carry on the above operations in accordance with an object program compiled from the above illustrated FØRTRAN source program are shown in the drawing merely to illustrate the constituents of a typical, conventional stored program controlled digital computer. The operation of the elements is well known per se, and in conjunction with a stored program. For a detailed discussion in this regard, see for example, G. M. Amdahl et al. Pat. 3,400,371.

The apparatus and methodology disclosed herein has thus been shown by the above to continuously control the parameters of a dichloro process such that the process reaches and maintains a status wherein hydrolysis losses are minimized while output product purity is preserved.

The above-considered arrangement and method are merely illustrative of the principles of the present invention. Numerous modifications and adaptations thereof will be readily apparent to those skilled in the art without departing from the spirit and scope thereof.

APPENDIX

```
        DIMENSION L(11),A(12,22)
        COMMON A,GRP1(64),ETOL,TOLP,TOLH,
          PHL(6),GRP2(12),NY,NR,NX,NC,NCl,
        *L,LPIT,GRP3(27),KWIT,LREA
        DATA BIG/1.0E37/
100     XXX=0
        LPIT=LPIT+1
        JMAX=0
        DO110J=1,NC
        IF(XXX—A(1,J))102,110,110
102     XXX=A(1,J)
        JMAX=J
110     CONTINUE
        IF(JMAX)200,200,112
112     IF(XXX—ETOL)300,300,114
114     IMAX=0
        XXX=BIG
        DO130I=2,NR
        IF(A(I,JMAX))122,130,124
122     IF(A(I,JMAX)+ETOL)126,130,129
124     IF(A(I,JMAX)—ETOL)129,130,126
126     XX=A(I,NCl)/A(I,JMAX)
        IF(XX)130,127,127
127     IF(XX—XXX)128,130,130
128     XXX=XX
        IMAX=I
        GO TO 130
129     A(I,JMAX)=0
130     CONTINUE
        IF(IMAX)400,400,134
134     DO140I=1,NR
        IF(I—IMAX)136,140,136
136     R=A(I,JMAX)/A(IMAX,JMAX)
        DO140J=1,NCl
        XX=R*A(IMAX,J)
        A(I,J)=A(I,J)—XX
140     CONTINUE
        L(IMAX—1)=JMAX
        IF(JD—2)142,150,150
142     WRITE(3,1142)LPIT,L
1142    FORMAT(1HO,1216)
        WRITE(3,1143)A
1143    FORMAT(1H,12E10.3)
150     IF(LPIT)200,200,100
200     JJ=NR—1
        J=NX+1
        DO202I=1,JJ
        IF(L(I)—J)202,204,202
202     CONTINUE
        GO TO 300
204     I=I+1
        IF(A(I,NCl))206,300,208
206     IF(A(I,J))300,210,210
208     IF(A(I,J))210,300,300
210     IF(LPIT)214,212,212
212     LPIT=—LPIT
        GO TO 215
214     LPIT=LPIT—1
215     JMAX=0
        XXX=BIG
        DO230J=1,NC
        IF(A(I,J)+ETOL)216,222,220
216     XX=A(1,J)/A(I,J)
        IF(XXX—XX)230,230,218
218     JJ=NR—1
        DO219I=1,JJ
        IF(L(I)—J)219,230,219
219     CONTINUE
        XXX=XX
        JMAX=J
        GO TO 230
220     IF(A(I,J)—ETOL)222,222,230
222     A(I,J)=0
230     CONTINUE
        IF(JMAX)300,300,114
300     RETURN
400     WRITE(3,401)
401     FORMAT('UNBOUNDED')
        KWIT=1
        GO TO 300
        END
```

What is claimed is:

1. In a system for producing a 2,4-dichloro, 6-alkylamine, 5-triazine by the reaction of cyanuric chloride with a lower alkylamine, a dichloro reactor, means for supplying cyanuric chloride, alkylamine, and caustic to said reactor, a plurality of controllers for controlling selected parameters of said reactor, a stored program controlled computer, a plurality of transducers for sensing selected operational reactor parameters, means for registering the magnitude of said sensed parameters in said computer in digital form, wherein said stored program controlled computer computes the purity of the effluent product produced by said system and the hydrolysis losses for said dichloro reactor, determines the variations of hydrolysis losses as functions of selected system parameters, determines a set of operating conditions for said reactor system parameters which reduces the system hydrolysis losses and which does not reduce dichloro purity below a threshold lower bound, and signal said set of conditions to said system controllers for implementation by said controllers.

2. A system as in claim 1 wherein said stored program controlled computers iteratively determines the output reactant flows for said dichloro reactor and iteratively solves a set of interdependent relationships for said output reactant flows as functions of each other, of said system parameters, and of the reactant input flows.

3. A system as in claim 1 wherein said stored program controlled computer determines the rate of conversion of cyanuric chloride to dichloro in said dichloro reactor.

4. A system as in claim 3 wherein said stored program controlled computer determines the rate of hydrolysis of cyanuric chloride in said dichloro reactor.

5. A system as in claim 4 wherein said stored program controlled computer determines the rate of hydrolysis of dichloro in said dichloro reactor.

6. A system as in claim 4 wherein said stored program controlled computer increments selected parameters of said dichloro reactor, determines the hydrolysis difference generated by reason of said parameter increments, and divides said hydrolysis difference by said parameter increments.

7. A system as in claim 3 wherein said stored program controlled computer determines the rate of formation of propazine in said dichloro reactor.

8. A system as in claim 1 wherein said stored program controlled computer determines a set of parameter values corresponding to reduced hydrolysis of input and derived reactants.

9. In a system for producing a 2,4-dichloro- 6-alkylamine, 5-triazine by the reaction of cyanuric chloride with a lower alkylamine, at least one reactor stage comprising a reaction chamber, means for supplying cyanuric chloride dispersed in a host fluid to said reaction chamber, means for supplying alkylamine to said reaction chamber, means for supplying caustic to said reaction chamber, a stored program controlled digital computer, flow rate meter means for signaling the rate of flow of said alkylamine supplied to said chamber, and the rate of flow of cyanuric chloride to said chamber, to said computer, controller means disposed intermediate said reactor and said source of caustic operable under computer control for regulating the flow of caustic into said reaction chamber for controlling the reaction pH, interstage valve means, a controller for selectively actuating said interstage valve means responsive to signals supplied by said computer, a heat exchanger for selectively cooling the contents of said reaction chamber, a controller for said heat exchanger operatively responsive to signals supplied thereto by said computer, sensor means for signaling the amount of reactants within said chamber, the pH of the contents of said chamber, and the temperature of said chamber contents to said computer, wherein said stored program controlled computer computes the purity of dichloro produced by said dichloro reactor system, computes the hydrolysis losses within said dichloro reactor system, selectively determines improved values for the operational pH, reactant volume and temperature for each of said reactor system stages, said improved values comprising variations about the corresponding actual operating conditions reported by said sensor means, and maintains the dichloro purity at or above a lower bound and signals said parameter controllers to implement said computed values.

10. A system as in claim 9 further comprising means for measuring the specific gravity of said cyanuric chloride-host fluid input flow and for registering said specific gravity in said computer, said stored program controlled computer multiplying the cyanuric chloride-host fluid flow rate signal supplied thereto by said flow rate meter means by a linear function of the output signal generated by said specific gravity metering means.

11. A combination as in claim 9 wherein said stored program controlled computer determines the variations of hydrolysis losses as functions of said reactor temperature, pH, and reagent volume of each reactor stage.

12. A method for preparing a 2,4-dichloro, 6-alkylamine, 5-triazine in a reactor system having at least one reactor stage comprising the steps of supplying cyanuric chloride, alkylamine, and caustic to said reactor, developing signals quantizing a plurality of operational system parameters, supplying said signals to a stored program digital computer, said computer computing the purity of dichloro prepared by said system and computing the hydrolysis losses for said dichloro reaction, determining the variations of hydrolysis losses as functions of selected system parameters, employing said hydrolysis variations to determine a set of improved operating conditions which represent variations about the sensed conditions for said reactor parameters for reducing the system hydrolysis losses and for maintaining dichloro purity at least to a lower purity bound, and selectively signaling said derived operating conditions to controllers for implementation of said computed conditions in said reactor.

13. A method as in claim 12 wherein said purity and hydrolysis loss computing steps include the steps of iteratively determining the effluent flows for each dichloro reactor stage, the output flow computation comprising iteratively solving a set of interdependent relationships between said output flow as functions of each other, of the sensed system parameters, and of the input flows to said reactor stage.

14. A method as in claim 12 wherein said purity and hydrolysis loss computing operations comprise determining the rate of conversion of cyanuric chloride to dichloro- for each stage.

15. A method as in claim 14 wherein said purity and hydrolysis computing operations include determining the rate of hydrolysis of cyanuric chloride in each stage.

16. A method as in claim 15 wherein said purity and hydrolysis computing operations include determining the rate of hydrolysis of dichloro in each stage.

17. A method as in claim 14 wherein said purity and hydrolysis loss computing operations include determining the rate of formation of propazine in each stage.

18. A method as in claim 17 wherein said purity and hydrolysis loss computing operations include determining the effluent alkylamine and cyanuric chloride flows for each of said reactor stages.

References Cited
UNITED STATES PATENTS

| | | | |
|---|---|---|---|
| 3,220,998 | 11/1965 | Berger | 235—151.12 UX |
| 3,429,881 | 2/1969 | Knüsli et al. | 260—249.5 X |
| 2,770,622 | 11/1956 | Gorton et al. | 260—249.6 X |
| 2,923,614 | 2/1960 | Gysin et al. | 260—249.5 X |
| 3,130,187 | 4/1964 | Tolin et al. | 235—151.12 X |
| 3,275,809 | 9/1966 | Tolin et al. | 235—151.12 |
| 3,492,283 | 1/1970 | Miller | 23—230 AX |
| 3,505,326 | 4/1970 | Shaw | 260—249.5 X |
| 3,558,045 | 1/1971 | Smith et al. | 235—150.1 X |
| 3,582,629 | 6/1971 | Ross | 235—151.1 |

OTHER REFERENCES

EAI general purpose analog computation, "Analog Computer Study of a Semi-Batch Reactor," Bulletin number ALAC 6317-1 ab, 1963.

JOSEPH F. RUGGIERO, JR., Primary Examiner

J. SMITH, Assistant Examiner

U.S. Cl. X.R.

23—230 A; 444—1